US009146870B2

(12) United States Patent
Francis et al.

(10) Patent No.: US 9,146,870 B2
(45) Date of Patent: Sep. 29, 2015

(54) PERFORMANCE OF ACCESSES FROM MULTIPLE PROCESSORS TO A SAME MEMORY LOCATION

(71) Applicant: ARM LIMITED, Cambridge (GB)

(72) Inventors: Hedley James Francis, Newmarket (GB); Robert Martin Elliott, Cambridge (GB); Ian Victor Devereux, Cambridge (GB); Daren Croxford, Burwell (GB)

(73) Assignee: ARM Limited, Cambridge (GB)

( * ) Notice: Subject to any disclaimer, the term of this patent is extended or adjusted under 35 U.S.C. 154(b) by 173 days.

(21) Appl. No.: 13/949,434

(22) Filed: Jul. 24, 2013

(65) Prior Publication Data

US 2015/0032970 A1    Jan. 29, 2015

(51) Int. Cl.
*G06F 13/38* (2006.01)
*G06F 12/08* (2006.01)
*G06F 12/12* (2006.01)
*G06F 9/52* (2006.01)
*G06F 3/03* (2006.01)

(52) U.S. Cl.
CPC ............ *G06F 12/0815* (2013.01); *G06F 9/526* (2013.01); *G06F 12/0811* (2013.01); *G06F 12/12* (2013.01); *G06F 2212/1016* (2013.01); *G06F 2212/1028* (2013.01)

(58) Field of Classification Search
None
See application file for complete search history.

(56) References Cited

U.S. PATENT DOCUMENTS

| 5,459,842 | A | 10/1995 | Begun et al. |
| 5,710,881 | A | 1/1998 | Gupta et al. |
| 5,826,089 | A | 10/1998 | Ireton |
| 2003/0079094 | A1 | 4/2003 | Rajwar et al. |
| 2003/0225992 | A1 | 12/2003 | Venkatrao et al. |
| 2008/0301378 | A1 | 12/2008 | Carrie |
| 2010/0169577 | A1 | 7/2010 | Kiyota |
| 2011/0066578 | A1 | 3/2011 | Chong et al. |
| 2011/0078692 | A1 | 3/2011 | Nickolls et al. |
| 2011/0202726 | A1 | 8/2011 | Laycock et al. |
| 2011/0289510 | A1 | 11/2011 | Lin et al. |
| 2012/0059804 | A1 | 3/2012 | Tapply et al. |
| 2013/0097458 | A1* | 4/2013 | Sekino et al. .................. 714/6.3 |

OTHER PUBLICATIONS

International Search Report and Written Opinion of the International Searching Authority dated Sep. 4, 2014 in PCT/GB2014/051601, 13 pages.
http://www.cs.nyu.edu/c/projects/ultra.
* cited by examiner

*Primary Examiner* — Scott Sun
(74) *Attorney, Agent, or Firm* — Nixon & Vanderhye P.C.

(57) ABSTRACT

A processing apparatus comprising: several processors for processing data; a hierarchical memory system comprising a memory accessible to all the processors, and several caches corresponding to each of the processors, each of the caches being accessible to the corresponding processor and comprising storage locations and corresponding indicators. There is also cache coherency control circuitry for maintaining coherency of data stored in the hierarchical memory system. The processors are configured to respond to receipt of a predefined request to perform an operation on a data item to determine if the cache corresponding to the processor receiving the request has a storage location allocated to the data item. If not, the processing apparatus is configured to: allocate a storage location within the cache to the data item, set the indicator corresponding to the storage location to indicate that the storage location is storing a delta value, set data in the allocated storage location to an initial value. The processor is configured in response to the predefined request to perform the operation on data within the storage location allocated to the data item.

19 Claims, 8 Drawing Sheets indicators

| X | X | X | O | X | X | X | X | △ |

PERFORMANCE OF ACCESSES FROM MULTIPLE PROCESSORS TO A SAME MEMORY LOCATION

TECHNICAL FIELD

The technical field relates to the field of data processing and in particular, to the performing of multiple subsequent operations on data stored in a same memory location.

BACKGROUND

In data processing systems that have multiple processors and a shared memory system, some operations that are performed on data items stored in the memory system may be restricted to being performed atomically so that the operation sequence of reading the memory location performing the operation and then writing the results back to the same memory location are performed such that they appear as if the sequence has either not been performed at all or has been performed in its entirety. In other words they are executed as one indivisible unit, hence the name atomic. This means that other operations that might be accessing the same memory location cannot access the data during the operation. Indeed in some systems, where the system cannot determine whether an access is to the same memory location, all memory accesses are blocked during the operation. Generally atomic operations are simple arithmetic operations that are performed on the data value. These arithmetic operations are often both commutative and associative, such that a change in order of the operations does not change the result. These operations typically come in two variants "Return" and "NoReturn", the Return variant returning to the program the original data value that was present prior to the operation being performed and the NoReturn not returning a data value. In some modern languages such as OpenCL which is becoming popular for parallel processing, these operations do not come in two variants only the Return variant exists. This is possible, as in the case that the value is not required, the returned value is simply not used.

A problem that arises with atomics is that if multiple atomics are performed on the same memory location, they need to be serialised such that the observable semantic that they have each been performed in full or not at all is maintained. For systems with a single or dual cores this is not a significant problem. However, with modern systems having ever increasing numbers of cores, serialising the operation of multiple cores reduces their performance to that of a single core, or in some cases even worse than this. This is because where different cores are accessing the same memory location, the data will need to be loaded from memory to the local cache and then back to memory for each core. When doing computations on a graphics processor for example, when an atomic instruction in a program is executed, it is typically started for all the threads in different cores at the same or similar times. This can lead to all of the atomics requiring access to the same address, or at least some of them doing so, at similar times. In such cases the accessed cache-line needs to be ping-ponged between the cores. This is slow and uses a lot of power. Given that all the threads are likely to be doing atomics at the same time then the cores will stall.

It would be desirable to be able to improve the performance of multiple cores performing operations, in particular atomic operations, to the same memory locations.

SUMMARY

A first aspect provides a processing apparatus comprising:
a plurality of processors for processing data;
a hierarchical memory system comprising a plurality of data stores for storing said data, said hierarchical memory system comprising a memory accessible to all of said plurality of processors, and a plurality of caches corresponding to each of said plurality of processors, each of said caches being accessible to said corresponding processor and comprising a plurality of storage locations and a corresponding plurality of indicators, said memory having a lower hierarchy than said plurality of caches;
cache coherency control circuitry for maintaining coherency of data stored in said hierarchical memory system;
each of said plurality of processors being configured to respond to receipt of a predefined request to perform an operation on a data item to determine if said cache corresponding to said processor receiving said request comprises a storage location allocated to said data item;
and if not, said processing apparatus is configured to:
allocate a storage location within said cache to said data item,
set said indicator corresponding to said storage location to indicate that said storage location is storing a delta value,
set data in said allocated storage location to an initial value, and
said processor is configured in response to said predefined request to perform said operation on data within said storage location allocated to said data item.

The technology described herein recognises that certain predefined requests may have properties that enable them to be treated in a particular way, which treatment may have a significant impact on performance of a processing apparatus where such operations are being performed by different processors on the same data item. Thus, rather than each operation being performed on the stored data item itself to generate an updated value, it may be acceptable for these predefined requests to allocate a storage location to the data item and rather than storing and updating the data item itself an initial value is stored in the location. The operation is then performed on this initial value and the storage location is marked to show that it stores a delta value and not the data item itself. The delta value can be seen as an indication of how different the data item having the operation performed on it would be to the current data item and this delta value can be used in conjunction with the operation and the data item itself to generate an updated data item. In this way the actual value of the data item does not need to be retrieved from memory rather a constant predetermined value can be used and the data item updated later.

These delta values can be stored locally to the individual processors in their local caches and the updated value of the data item can be calculated from these accumulated results at the point that the value needs to be returned. This avoids the need to continually access the data item from memory in order to update the data item multiple times in multiple different caches.

The predefined requests are a subset of the requests received that have certain properties. They may be a number of things, but in some embodiments said predefined request comprises a request for a processor to perform an atomic operation that updates a data item and does not return a value to said processor executing said request.

As noted in the introduction atomic operations that update data items need to be serialised and can therefore cause multiprocessor systems to stall. Where they do not return a data value to the processor executing the request then it has been recognised that in some cases where the data item is not stored locally it does not need to be retrieved, rather an operation can be performed on an initial value and the storage of this result will be sufficient to enable the updated data item to be generated when required provided that the operation and the original data item are known. In this way the requirement to transfer data items between cores is reduced.

In some embodiments, said predefined request comprises a marked request.

In order for the processing apparatus to determine which requests can be treated in this way, in other words which are the predefined requests, these requests may in some cases be marked. This marking may simply be the addition of a "no return indication" to the request indicating that no data needs to be returned or it may be a particular indicator associated with the request that perhaps the programmer has inserted. It may equally be simply a type of request that the processor is configured to recognise.

In some embodiments, said marked request is a request that has been identified and marked during compilation.

During compilation of a program, instructions are generated and the compiler will determine for cases where an instruction is configured to return a data value, whether or not that returned data value is used. If it is not used by subsequent instructions then the compiler can mark the instruction as a "no return" instruction without causing errors in the program. This may be seen as providing a marked request which indicates that the request is one of the predefined requests that can be treated locally using initial values to generate delta values. Alternatively, the compiler may determine the types of request that are suitable for this local treatment and provide some other sort of indication associated with them such that a subset of requests sent by the compiler are marked in a particular way and can be treated in the way claimed.

In some embodiments, each of said processors is configured in response to determining that said cache corresponding to said processor receiving said predefined request comprises a storage location allocated to said data item and comprising said indicator indicating said storage location is storing said delta value to:

update said delta value by performing said operation of said request on said delta value.

Once a line is allocated to the particular data item and marked as storing a delta value, then any of the predefined requests received for that data item, update the delta value that is stored in that storage location by performing the operation of the request on the stored delta value. In this way, the operations on this data item are accumulated within this local delta value and this delta value can be used to update the data item when the updated value needs to be returned, and the need to continually retrieve the data item from lower hierarchy data stores is avoided.

In some embodiments, said indicator comprises plurality of bits and provides an indication of an operation corresponding to said delta value.

In some cases there may only be one or a small number of compatible operations that are suitable to be combined and accumulated in this way. In such cases, then a simple single bit indicator is all that is required to indicate that the values stored are delta values from which it can be determined that they relate to the operation(s) of the predefined requests. However, in other embodiments there may be a greater number of operations which are suitable to be treated in this way and which are not necessarily compatible with each other. In this case, the indicator needs to indicate the operation that the delta value corresponds to and therefore it comprises a plurality of bits such that it can provide an indication of an operation corresponding to said delta value.

In this way where there are several different sorts of operations that cannot be combined with the same delta values, then the indicator will indicate what sort of operation the delta value corresponds to, such that when a request for performing an operation is received it can be determined whether the storage location allocated to that data item and storing a delta value, is storing a delta value generated from that particular type of operation.

In some embodiments, each of said plurality of processors is configured in response to determining that said cache corresponding to said processor receiving said request comprises a storage location allocated to said data item and comprising said indicator indicating said storage location is storing said delta value, to determine from said indicator if said operation corresponding to said delta value is compatible with said operation of said request:

and if so to update said delta value by performing said operation of said request on said delta value;

and if not to evict said storage location from said cache.

Where the indicator indicates the type of operation then when a request for a data item that has a storage allocation with a delta indicator associated with it present in the cache for that processor, the processor can determine whether the indicator indicates that the operation of the request is compatible with the delta value stored or not. If it is then the delta value stored is updated by performing the operation of the request on this value. If it is not compatible then the storage location will be evicted from the cache. In this regard, eviction of the storage location from the cache will cause the actual data item to be identified in a lower hierarchy data store and to be updated by performing the operation indicated by the indicator of the evicted location on the data item using the delta value stored in that location. At this point the cache coherency circuitry will check other level 1 caches for delta values of the same or a compatible operation for this data item and update the data item using these delta values.

The storage location of the evicted line or indeed another storage location in the cache can then be allocated to the data item and the indicator set to indicate the operation of the current request. The value is then set to the initial value for that type of operation and the operation is performed on this initial value.

In some embodiments, said delta value comprises a value required for generating an updated data item from one or more combined operations, and said indicator indicates an operation to be performed on said data item using said delta value to generate said updated data item for those combined operations.

As noted previously the delta value comprises a value that is required for generating an updated data item from one or more combined operations by performing the operation on the data item using the delta value. Where there is a system where there may be multiple non-compatible operations then the indicator will indicate the operation to be performed on the data item using the indicator such that the indicator and delta value between them are sufficient to be able to generate an updated data item from the data item that is currently stored in a lower hierarchy data store.

In some embodiments, operations that are compatible comprise a same operation or operations that form a group of operations that can be performed on a data item in any order and generate a same result.

Operations that are compatible are the same operation or those that form a group of operations that can be performed on a data item in any order and still generate the same results, for example adds and subtracts where subtracts are performed as additions of negative numbers.

In some embodiments, said operation comprises one of an add, subtract, increment or decrement, or a logical operation comprising an OR, AND or XOR or a comparative operation comprising a min or a max.

As listed above there are several types of operation that are suitable for combining in this way and some such as add, subtract, increment and decrement will form a group of operations that can be performed on the same delta value and still produce a correct result while others will need to be performed as individual operations on delta values specific to that operation. These different operations will have different initial values set and will be indicated by different indicators. Thus, add, subtract, increments or decrements will have an initial value of zero and a particular indicator, while the logical operations may have different initial values, for example an AND will have an initial value of all ones and will have its own indicator value. The min operation will have an initial value of the largest representative value stored while the max operation will have the smallest value stored as the initial value. None of these operations can be combined with each other and as such they all have different indicator values.

In some embodiments, said memory system comprises said plurality of caches with a high hierarchy, at least one lower hierarchy data store comprising at least one further cache, said at least one further cache being accessible to at least some of said plurality of processors, and said memory of a lowest hierarchy that is accessible to all of said plurality of processors.

The memory system is a hierarchical memory system having high level caches associated with each of the processors and then lower hierarchy cache or caches accessible to all or some of the processors and then at the lowest hierarchy level a memory which is accessible to all of the processors.

In some embodiments, said cache coherency control circuitry is configured to respond to receipt of a request to return an updated data item, to determine if there is a storage location within any of said plurality of caches that is allocated to said requested data item and comprises said indicator indicating that said storage location stores said delta value, and if so to access said memory system to identify a data store currently storing said requested data item and to update said stored data item by performing an operation on said data item indicated by said indicator, using said delta values from each of said plurality of caches that comprise said storage location allocated to said data item and said indicator.

As noted previously delta values can be used to store what can be viewed as intermediate values resulting from combined operations which values can later be used to generate an updated data item. This is fine as long as the updated data item does not need to be returned. If there is a request to return the data item then in general it needs to be updated using all of the delta values and the operation that they are associated with. Thus, in response to receipt of a request to return an updated data item, the system needs to determine whether or not there are delta value(s) related to that data item stored in the various caches, this may be done by accessing these caches or it may be done by accessing a central scorecard that stores information indicating which cache lines have delta values associated with them. If there are, the data item in the lower hierarchy memory is located and updated by performing the operations indicated by the indicator(s) associated with the delta value(s) on the data item using the delta value(s) stored. Where there are multiple delta values stored in multiple caches then the operations are performed a multiple number of times with the different delta values.

In some embodiments, said cache coherency control circuitry is configured to respond to receipt of a request to return an updated data item, to determine if there is a storage location within any of said plurality of caches that is allocated to said requested data item and comprises said indicator indicating that said storage location stores said delta value, and if so to access said memory system to identify a data store currently storing said requested data item and to update said stored data item by performing an operation on said data item indicated by said indicator, using said delta values from each of said plurality of caches that comprises said storage location allocated to said data item and comprises said indicator.

The request to return the data item may be a request to read the data item. In each of these cases the updating of the data item should be performed using these delta values.

In some embodiments, said processing apparatus further comprises operation circuitry associated with said lower hierarchy data store and configured to perform said operation on said data item indicated by said indicator using said delta values.

In order to perform the operation on the data item in the lower hierarchy store using the delta values circuitry performing this operation needs to be present in the processing apparatus associated with this lower hierarchy store such that the data item can be updated using the delta values.

In some embodiments, said cache control circuitry is configured in response to determining said cache having a storage location allocated to said data item of said predefined request that does not have said indicator set to indicate storage of said delta value, to evict said data item to a lower hierarchy data store in said memory system.

In some cases the data item itself may be stored in the cache and in such a case, in some embodiments the operation is performed on that data item, while in others the data item is evicted and the line is allocated to the data item and an indicator set to indicate that a delta value is stored there, whereupon the initial value is stored in this line and the operation performed on that. It may be convenient to restrict the processing apparatus to perform operations of the predefined requests only on delta values and to evict the data item if it is present in the level one cache. This will mean that the data item is present in a lower hierarchy memory and when the system needs to generate the updated data item perhaps in response to a read request then the data item will be retrieved from the lower hierarchy memory and will not be present in the level one cache.

In some embodiments, said data processing apparatus is configured to synchronise said memory system by generating a memory barrier request, said plurality of caches being configured in response to receipt of said memory barrier request to identify storage locations having said indicators and to evict said delta values from said storage locations and to update said corresponding data item in a lower hierarchy data store by performing operations indicated by said indicator on said data item using said delta value and to send a response to said memory barrier request when said updates are complete.

In some cases, it may be advantageous to be able to determine at a certain point that all outstanding predefined requests have completed. The provision of a memory barrier instruction that can be executed and force the outstanding predefined request to complete and returns a response when they have completed allows future instructions to know that these outstanding requests have completed.

In some embodiments, the processing apparatus comprises performance control circuitry configured to identify storage locations within said plurality of caches with said delta value indicator set and to determine current available capacity for updating a lower hierarchy data store in said memory system, said performance control circuitry being configured to evict one of said identified storage locations and to update said corresponding data item in said lower hierarchy data store by performing an operation indicated by said indicator on said data item using said delta value in response to detecting available capacity.

It may be advantageous to have performance control circuitry that monitors available capacity for updating lower hierarchy data stores and takes advantage of this by forcing eviction of delta values and updating of the data items. This can be advantageous where the cache cleaning operation is issued on a system as it will avoid the system having caches that are very full of lines containing deltas. Such caches will take a long time to clean and thus, making use of such a background task can improve performance.

A second aspect of the present invention provides a method of compiling a computer program, comprising the steps of:
  receiving said computer program;
  transforming said computer program into an intermediate version of said computer program;
  identifying instructions within said intermediate version of said computer program that perform an atomic operation on a data item and do not return a data value or do return a data value but said returned data value is not used by subsequent instructions in said computer program;
  marking said identified instructions such that instructions performing atomic operations where no returned data value is used by subsequent instructions, are differentiated from other instructions in said compiled program code.

The present technique recognises that there are some performance improving techniques that are suitable for atomic operations that either do not return a data value or do return one but the value is not used by subsequent instructions. In particular, in some program code, the code is such that data values are always returned while they are often not required. These operations can be identified at compilation time, and can be marked allowing a processor executing the compiled code to determine from the markings where certain techniques may be applied and where they would not be suitable.

A third aspect of the present invention provides a computer program for controlling a data processing apparatus to perform the steps in the method according to a second aspect of the present invention.

A fourth aspect of the present invention provides a method of handling marked requests in a data processing apparatus comprising a plurality of processors for processing data, a hierarchical memory system comprising a plurality of data stores for storing said data, said hierarchical memory system comprising a memory accessible to all of said plurality of processors, and a plurality of caches corresponding to each of said plurality of processors, each of said caches being accessible to said corresponding processor and comprising a plurality of storage locations and a corresponding plurality of indicators, said memory having a lower hierarchy than said plurality of caches; and cache coherency control circuitry for maintaining coherency of data stored in said hierarchical memory system;
  said method comprising the steps of:
  in response to one of said plurality of processors receiving a predefined request to perform an operation on a data item;
    determining if said cache corresponding to said processor receiving said request comprises a storage location allocated to said data item;
    and if not: allocating a storage location within said cache to said data item,
      setting one of said indicators corresponding to said storage location to mark said storage location as storing a delta value,
      setting data in said allocated storage location to an initial value, and
      updating data within said storage location allocated to said data item by performing said operation on said stored data.

A fifth aspect of the present invention provides a processing apparatus comprising:
  a plurality of processing means for processing data;
  a hierarchical memory system comprising a plurality of data storage means for storing said data, said hierarchical memory system comprising a memory accessible to all of said plurality of processing means, and a plurality of caches corresponding to each of said plurality of processing means, each of said caches being accessible to said corresponding processing means and comprising a plurality of storage locations and a corresponding plurality of indicators, said memory having a lower hierarchy than said plurality of caches;
  cache coherency control means for maintaining coherency of data stored in said hierarchical memory system;
  each of said plurality of processing means being for responding to receipt of a predefined request to perform an operation on a data item to determine if said cache corresponding to said processor receiving said request comprises a storage location allocated to said data item;
    and if not, said cache coherency control means is for:
    allocating a storage location within said cache to said data item,
    setting said indicator corresponding to said storage location to indicate that said storage location is storing a delta value,
    setting data in said allocated storage location to an initial value, and
  said processing means is for responding to said predefined request to perform said operation on data within said storage location allocated to said data item.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 shows a cache comprising a line storing delta values according to the present technique;

DESCRIPTION OF THE EXAMPLE NON-LIMITING EMBODIMENTS

Figure 1:
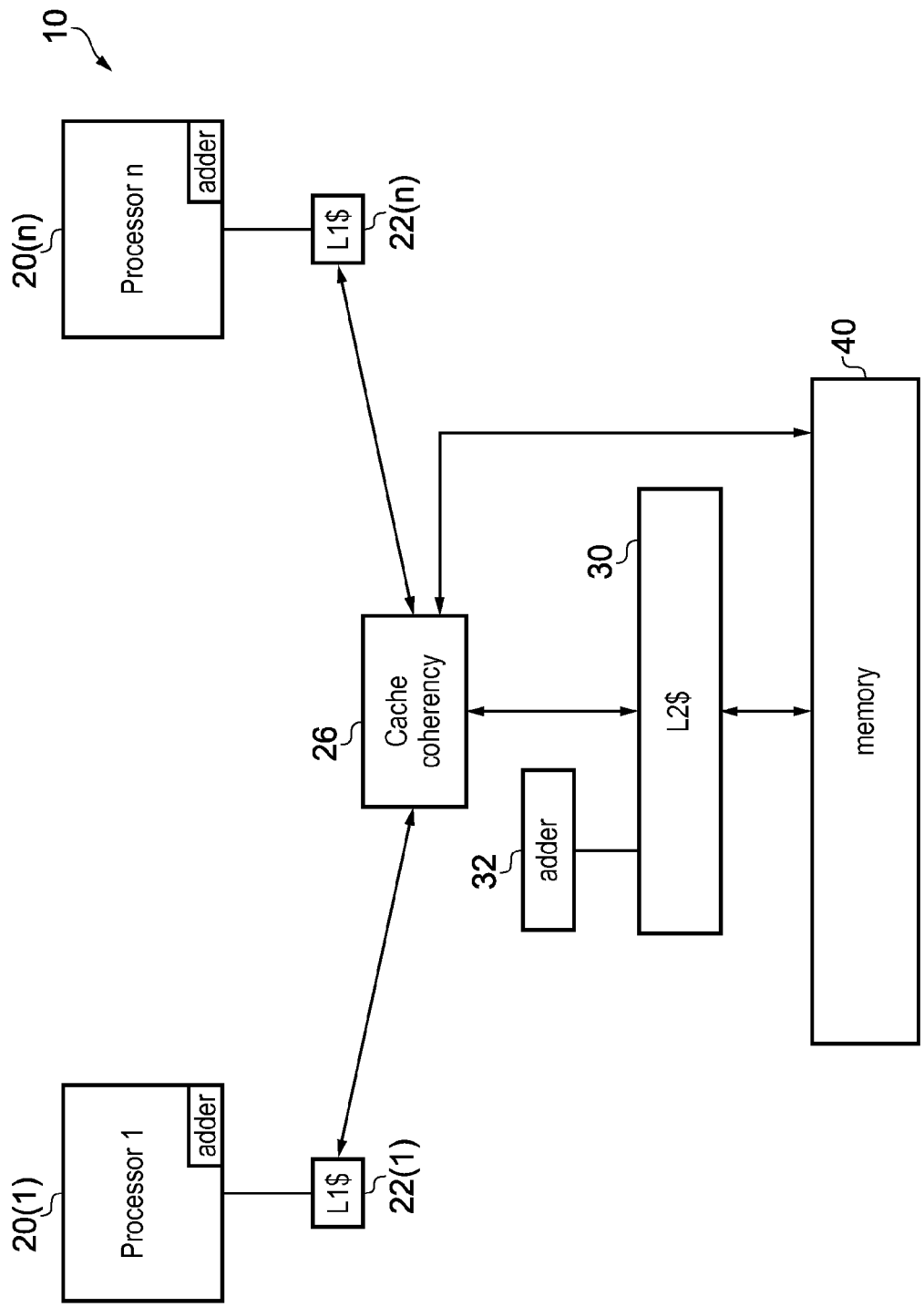
FIG. 1 shows a data processing apparatus according to an embodiment of the present invention.

FIG. 1 shows a data processing apparatus 10 according to an embodiment of the present invention. The data processing apparatus has multiple processors 20(1) . . . to 20(n), each having its own L1 cache 22(1) to 22(n). These level 1 or L1 caches are part of a hierarchical memory system that also includes an L2 or level 2 cache 30 and a memory 40.

The level 1 caches have the highest hierarchy and are located close to their respective processor, are only accessible by that processor, and are fast to access. The next level in the hierarchical memory system is the level 2 cache which is larger than level 1 caches and is accessible to all of the processors. It takes longer to access than the level 1 caches but is quicker to access than the memory 40, which is a lot larger than the caches and takes substantial amounts of time to access. Several copies of a data item may be stored in the different hierarchical levels of this memory system and thus cache coherency circuitry 26 is present to ensure coherency between these data items such that if a processor requests a particular data item the cache coherency circuitry 26 ensures that the most recent version is returned to the processor. It should be noted that although in this embodiment the cache coherency circuitry is shown as being separate to the L1 cache 30, in other embodiments they may be formed as a single block.

As this is a multiple processor system where the same memory space is accessed by the different processors there are certain operations performed on data items in a memory location that must be performed atomically, that is they must not be able to be interrupted and no other processor should be allowed to access this storage location while the operation is being executed. Where several processors are accessing the same memory space it may be that the same location is required by several of the processors and as the operation needs to be performed atomically then these operations must be serialised which can cause long delays as the data item in question is ping ponged between the level one caches of the different processors trying to update the item.

The present technique has recognised that for some of these operations which do not need to return a value immediately and which are simple arithmetic operations with associative and commutative properties such that their order of execution does not affect the end result, then this potential bottleneck can be avoided, by performing the operations on "delta values" rather than requiring the data item itself to be fetched.

In this embodiment, the operations concerned are add, subtract, increment or decrement, where the subtraction or decrement is performed as an addition using a negative number. When the processing apparatus receives a request to perform one of these operations on say processor1 20(1) then rather than performing the operation on the data item itself, a line in the level one cache 22(1) is allocated to the data item, that is to the current address of that data item, and is marked as storing a delta value. The allocated line is then set to an initial value of zero and the operation is performed on this initial value using the adder associated with the processor.

In this way, a delta value is stored in cache 20(1) for this operation. If another add, subtract, increment or decrement operation is received by processor1 to the same storage location then this operation is also performed on this delta value and a new delta value is stored in cache 22(1). In this embodiment the delta value indicates the difference between the data item currently stored and the updated data item that would be generated from the operations that have been performed on the delta values.

If a different processor 20(n) receives a request to perform such an operation on the same storage location then it will allocate a line in its level one cache 22(n), set this to an initial zero value and perform the operation on this initial value by using the adder which in this embodiment is located within the processor, although in other embodiments it may be located outside of the processor. In this way, the actual data item to be updated is not retrieved from one of the lower hierarchical data stores, but rather delta values are stored within the level one caches and these can be used later to update the data item, when an updated value is requested.

In this regard an updated data item will need to be returned if one of the processors requests this data item perhaps in response to a read request in a program it is executing. In response to such a request the cache coherency circuitry 26 will check the level one caches 22(0) to 22(n) to determine if there are delta values stored for the requested data item and if there are the cache coherency control circuitry will check the level 2 cache 30 for the data item and if it is not there will access the data item from memory 40 and store it in the level 2 cache 30. It will control the update of the requested data item by controlling the adder 32 which in this embodiment is associated with the level 2 cache 30 to add the delta values retrieved from the respective level 1 caches 22 where they are stored to the data item stored there in the level 2 cache 30 to generate the updated data item that can then be returned to the requesting processor.

It should be noted in this embodiment the operations whose performance are improved using this technique are add, subtract, increment or decrement and the delta values are either a negative or positive value that is simply added to the data item in the level two cache when updating.

In other embodiments described later the operations may be logical functions such as an AND, an OR or an exclusive OR, XOR. In these a different initial value will be set in the level one cache and a different process performed to update the data item, thus in these cases rather than having adders 32 for performing the operation there will be different logical circuitry associated with the caches to update the delta values and eventually the data item.

It should be noted that the operations that are to be performed locally to generate delta values can be identified in a number of ways. Thus, it may be that a particular type of operation is recognised by the decoder within the processor and these operations are all treated in this way. Alternatively, it may be that a compiler marks the requests that are for operations that it is suitable to treat in this way and the processor recognises the marked requests and treats them in this way.

Figure 2:
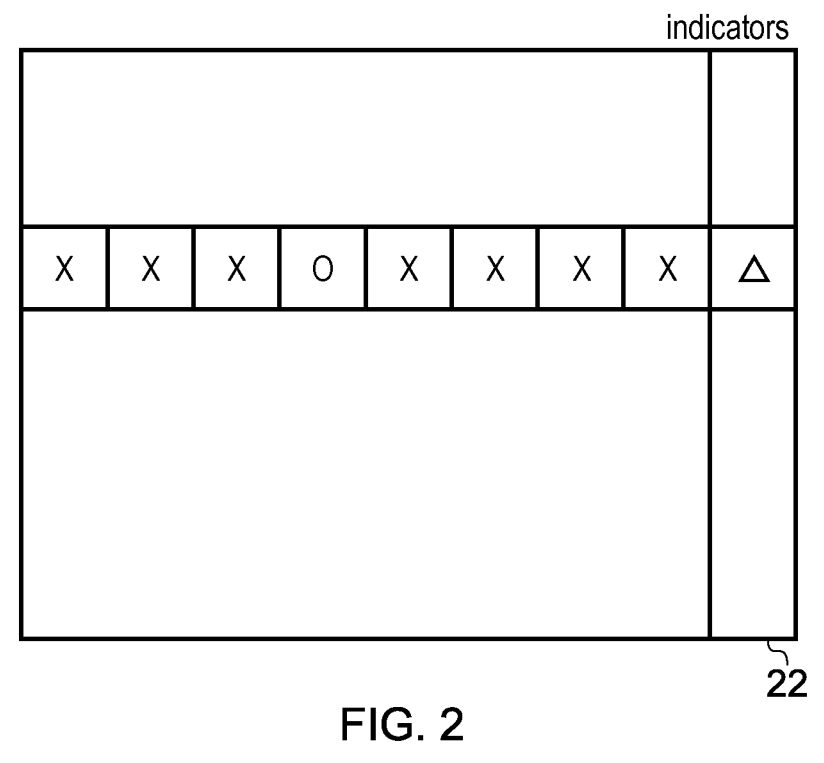

FIG. 2 shows an example of a level one cache 22 according to an embodiment of the present invention. The level one cache has different storage locations which are identified by addresses and are in this case lines within the data cache 22. Each line can store several words of data and indicators associated with the line indicate which of the words currently store valid data. These indicators may also indicate the coherency of the data stored, that is not only whether it is valid or not, but also whether it is dirty or clean, that is whether it stores a more up to date version of the data item than lower hierarchical data stores currently store. The indicator also indicates whether the line stores a data item or a delta value (shown in the figure as Δ). In some cases the indicator may also indicate the nature of the operation associated with the delta value.

In this regard, in some embodiments such as that disclosed with respect to FIG. 1, only one group of compatible operations are treated locally using delta values, and thus any delta value indicator indicates that the operation to be performed can be performed with an adder. However, in other embodiments other operations that suitable for being treated locally may also generate their own delta values using different operations. In such a case the operation corresponding to the delta value must be indicated by the indicator, such that a request to perform an operation on a data item can determine whether a delta value for that data item and that operation exists or not and if it does exist the operation may be performed locally on that delta value.

In this example the valid data stored is a 0 which in this case is a delta value, which would be indicated by the indicators.

Although, FIG. 2 shows a level one cache, it should be understood that the level two cache also has indicators associated with it and in that case there may be an indicator stored that indicates where a data item stored in the level two cache has corresponding delta values stored in at least one level one cache. This enables the cache coherency circuitry to recognise where the data item will need to be updated with the delta values before the real value can be returned. In some embodiments the level 2 cache may itself store delta values, which may be a single delta value from a level 1 cache or a combination of delta values from different level 1 caches corresponding to the same address and operation. This may be convenient where the lines storing the delta values are evicted from one or more level 1 cache but the updated data item is not yet required and is not currently stored in the level 2 cache.

Figure 3:
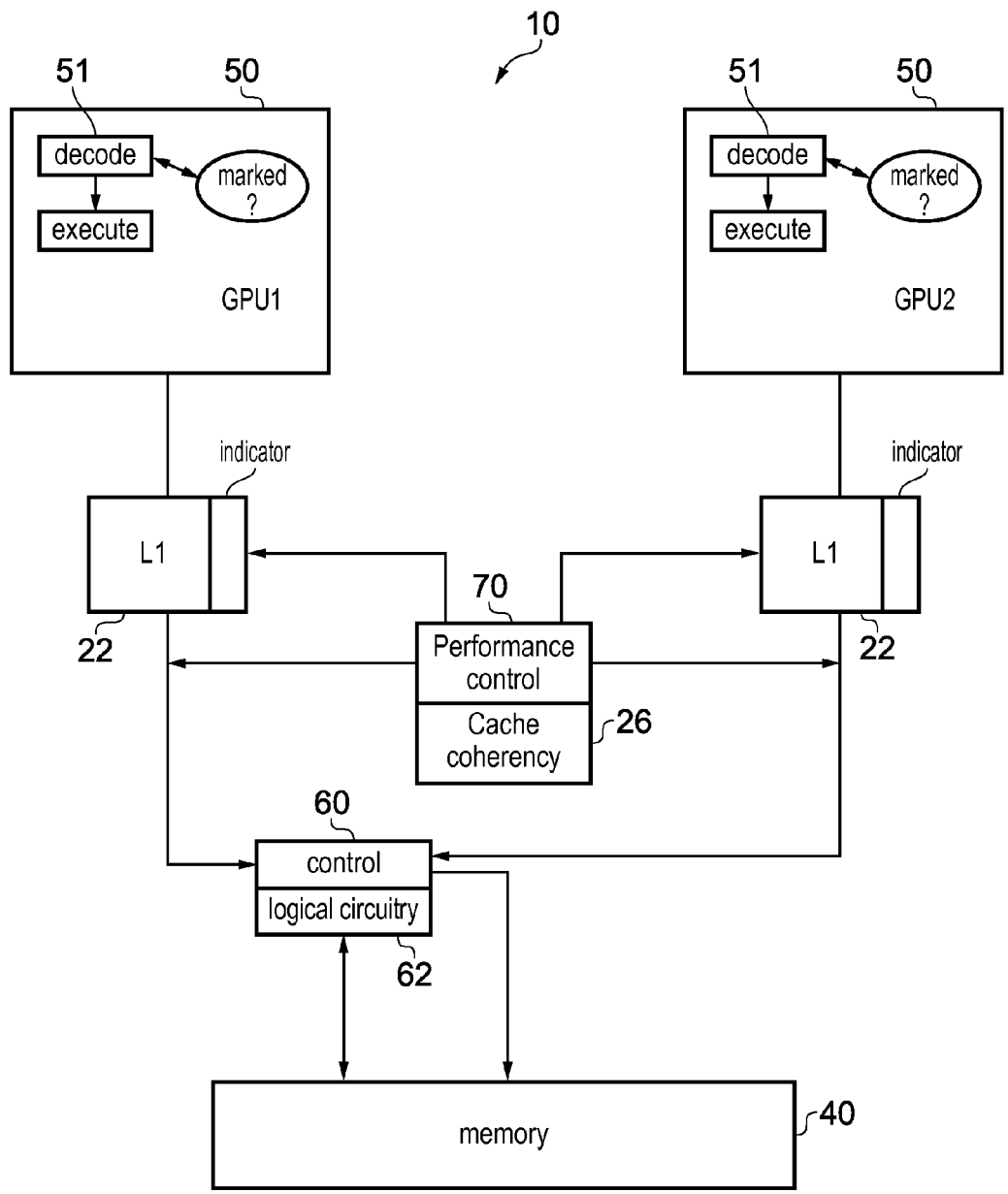
FIG. 3 shows a data processing apparatus having multiple GPUs according to an embodiment of the present invention.

FIG. 3 shows an alternative embodiment of a data processing apparatus 10. In this embodiment, there are multiple processors in the form of graphical processing units GPU1 and GPU2. Instructions received at a GPU are decoded by decoder 51 and marked instructions within the received instructions are identified and when these are executed by execution unit 52, rather than performing the operations requested on the selected data item the requested operations are performed on delta values stored within the level one cache 22. Where there is no current storage location allocated to a delta value for the requested data item and operation, then in response to receiving a marked instruction a storage location in the level one cache is allocated to that data item and an initial value is stored within it.

If the data item is already stored in the level one cache then although in some embodiments it may be updated immediately, in this embodiment it is evicted to memory 40. Furthermore, where there is a line allocated to a delta value for that data item with an indicator indicating a different operation then this line is evicted from the level one cache and the corresponding data item in memory is updated by logical circuitry 62 using the delta value stored and the operation indicated by the indicator. Also, when the updated data item needs to be returned perhaps due to eviction of the lines from the level one cache or due to a read then control circuitry 60 controls logical circuitry 62 to perform the appropriate operations on the data items stored in memory with the delta values retrieved from the level one cache or caches.

In this embodiment there is performance control circuitry 70 associated with the cache coherency circuitry 26. It detects activity on the busses and determines when there is spare capacity for performing memory updates. In response to detecting spare capacity it identifies storage locations within the level one cache which are marked with an indicator indicating that delta values are stored within them. It then evicts these delta values from the level one cache and uses control circuitry 60 and logical circuitry 62 to update the corresponding data item in memory 40. This enables the processing apparatus to take advantage of any spare capacity that it may have a particular time and means that if for example, a cache clean command is received for cleaning one of the level one caches the number of lines that store delta values will have been reduced. The cleaning of a level one cache that stores these delta values takes time as logical circuitry 62 will need to perform the operation on the delta value to update the corresponding data item in memory 40.

This embodiment, also provides the possibility of synchronising the caches from time to time. This may be instructed by the cache coherency circuitry 26 or performance control circuitry 70 associated with it, when it is determined that it will be beneficial at this point in the execution of data for the hierarchical memory system to be synchronised. Such a synchronisation request requires all of the delta values present in the level one caches to be evicted and the corresponding data items in the memory 40 to be updated using the logical circuitry 62. In order to determine when this synchronisation is complete a barrier instruction may be sent to follow the synchronisation request and when a response to the memory barrier instruction has been received it can be determined that all of the updating has completed.

Figure 4:
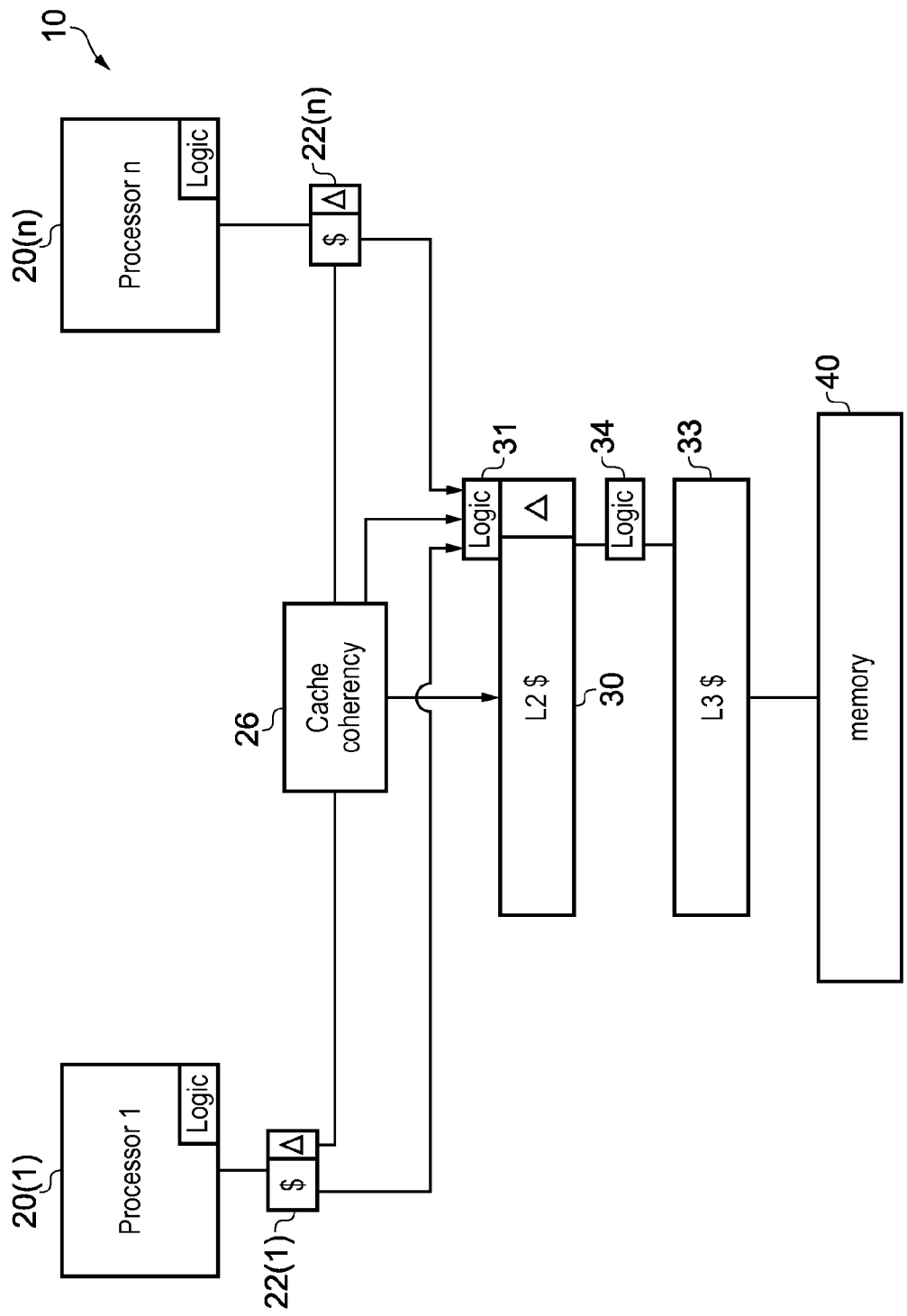
FIG. 4 shows a data processing apparatus according to a further embodiment of the present invention having further levels of cache hierarchy.

FIG. 4 shows a data processing apparatus according to an embodiment of the present invention. In this embodiment there are again n processors 20(1) ... 20(n) each having their own level one cache 22(1) ... 22(n). There is a level two cache 30, a level three cache 33 and memory 40. There is also cache coherency circuitry 26 that maintains the coherency of the data stored in the different data stores.

In this embodiment, each of the level one caches and the level two caches are configured to be able to store delta values for particular operations. Thus, where a marked request is processed by one of the processors a line is allocated to that data item in the level one cache if a line has not already been allocated and the indicator associated with that line is set to indicate that a delta value is stored and the nature of the operation. The line is then updated with an initial value for that operation and the operation is performed. This process may be performed several times, where multiple requests to perform the same or different but compatible operations on this data item such that an accumulated delta value is stored in the level one cache. Such operations may also be performed by the other processors such that accumulated delta values will be stored in their caches.

There may be cache cleaning operations that occur from time to time which evict some of the delta values from the level one cache and in this embodiment these evicted values are simply evicted to the level two cache and are stored there as delta values. If there is already a line allocated to that data item which is marked as having a compatible delta value then logic 31 associated with the level two cache 30 will perform the operation on that delta value and will update it accordingly. It should be noted that there is logic associated with each of the processors that can perform the operations requested by the processor on the delta values in the level one caches.

When the data item is to be returned then the data item is sought in the lower hierarchy memory system and if it is in the memory it is uploaded to the level three cache 33. The delta values within the level one caches are then evicted and the delta values in the level two cache are updated using logic circuitry 31. If there is not a delta value currently in the level two cache 30 then in this embodiment one is created and is updated accordingly. This final delta value is then sent via logical circuitry 34 to the level three cache 33 where the data item stored in the level three cache is updated. It should be noted that although in this embodiment the delta values are accumulated in the level 2 cache, and the data item is updated in the level 3 cache, this is simply one possibility and as would be understood by the skilled person, the data items could be updated in the level 2 cache, or in the memory.

Figure 5:
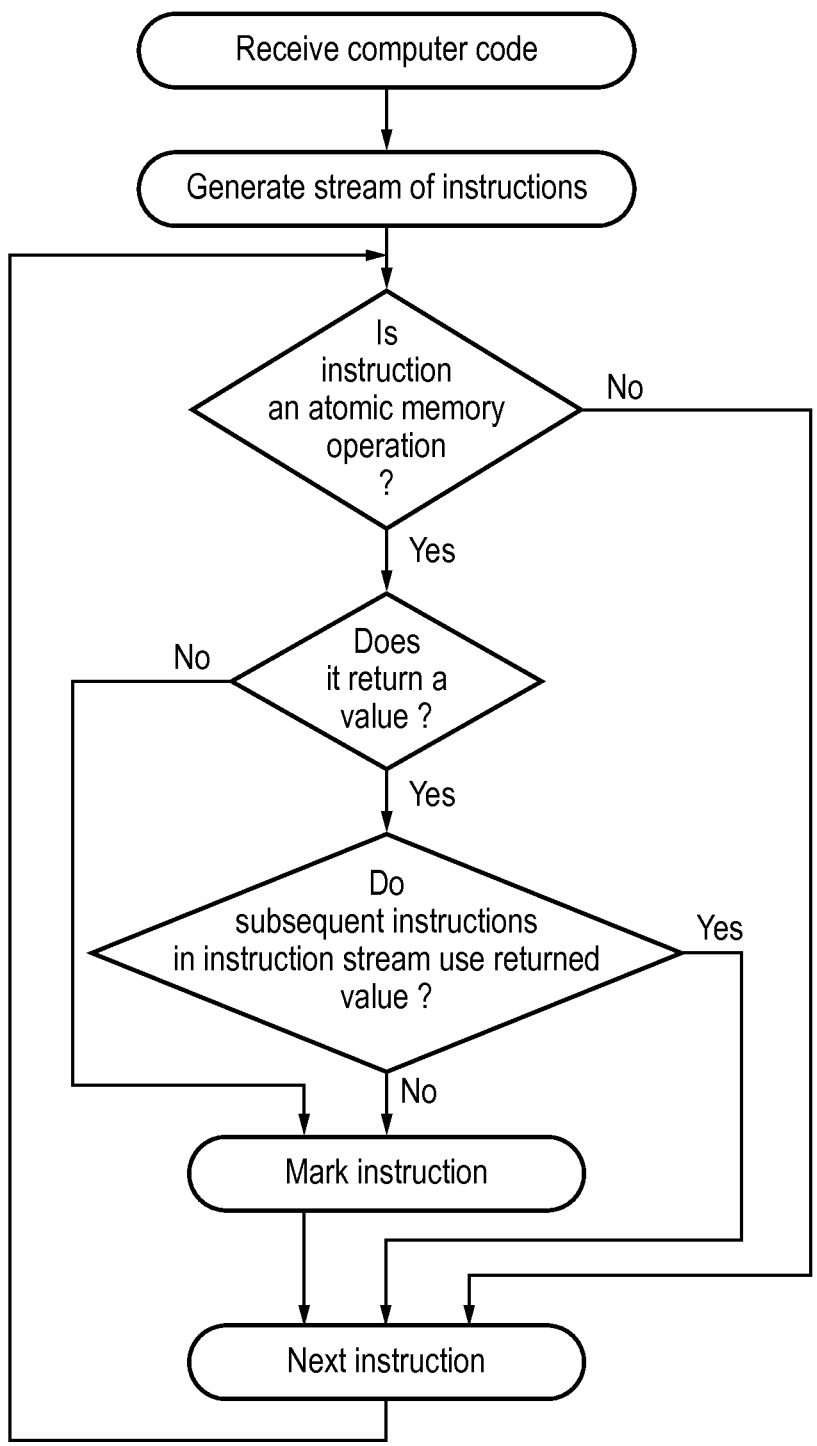
FIG. 5 shows a flow diagram illustrating steps in a method for compiling computer code according to an embodiment of the present invention.

FIG. 5 shows a flow diagram illustrating steps in a method of compiling code according to an embodiment of the present invention. In this embodiment, computer code is received and is transformed into an intermediate version of the code comprising a stream of instructions using the compiler. Each of these instructions is analysed and it is determined if it is for an atomic memory operation. If it isn't then the next instruction is looked at. If it is it is determined if it returns a value. If it doesn't then it is marked and the next instruction is looked at.

If the instruction does return a value then it is determined if the subsequent instructions in the instruction stream use the returned value. If they don't then the instruction is marked and if they do then the next instruction is looked at. In this way, a subset of instructions is marked as instructions for which the present technique is applicable. These marked instructions are later used by the processor to determine whether or not when an operation is to be performed instructed by such an instruction a delta value should be generated and used or whether the data item should be retrieved.

Figure 6:
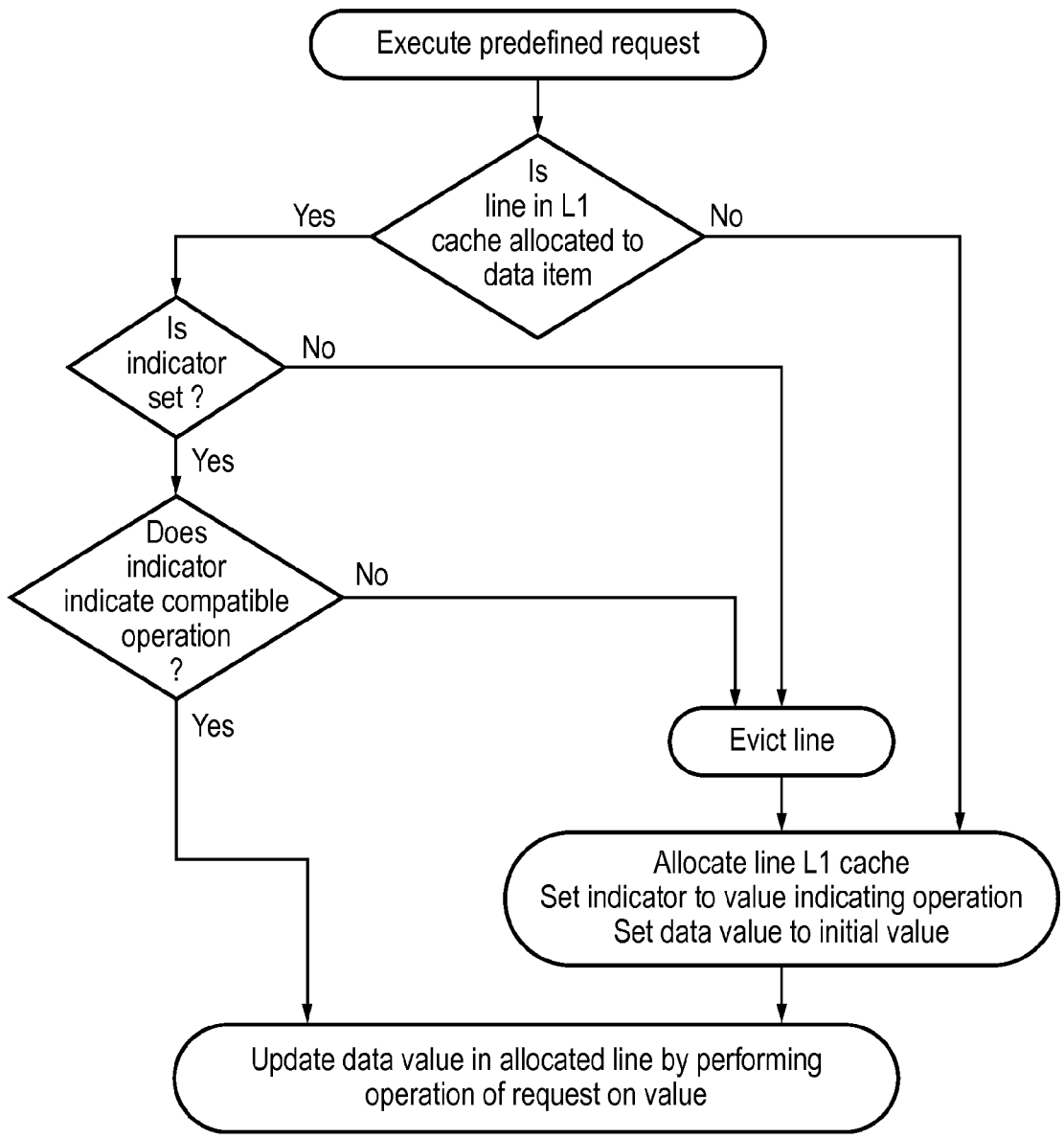
FIG. 6 shows a flow diagram illustrating steps in a method according to an embodiment of the present invention.

FIG. 6 shows steps in a method according to an embodiment of the present invention. A predefined request, which may be a marked request from the compiler of FIG. 5 is executed by a processor. It is then determined if there is a line in the level one cache of that processor that is allocated to the data item specified by the request. If there is it is determined whether or not the indicator is set for this line and if it is set it is determined whether the indicator indicates a compatible operation. If it does then the data value in the allocated line is updated by performing the operation of the request on the data value stored therein. If the indicator is not set or the indicator indicates incompatible operation then the line is evicted.

Where the indicator was not set, the data item in the evicted line is simply sent to a lower hierarchy memory and stored there. Where it was marked as having a delta value which was not compatible with the current operation then the delta value is evicted and the operation indicated by its indicator is performed on the data item stored in the lower hierarchy store using the delta value and the stored data item is in this way updated. At this point the cache coherency circuitry will check the other level one caches to determine whether or not they have any of the data items marked with an indicator not compatible with the indicator of the current request and will update the data items using these delta values.

Where there is no line allocated to the data item in the level one cache or where the line that was allocated has now been evicted then a new line is allocated to the level one cache or the evicted line is used and the indicator is set to a value to indicate the current operation. An indicator value may also be set to indicate what portion of the line is being used where only a portion of the line is being used. The data value is then set to an initial value that is suitable for that operation.

The data value in the allocated line which in this case is the initial value will then be updated by performing the operation of the request on this value.

Figure 7:
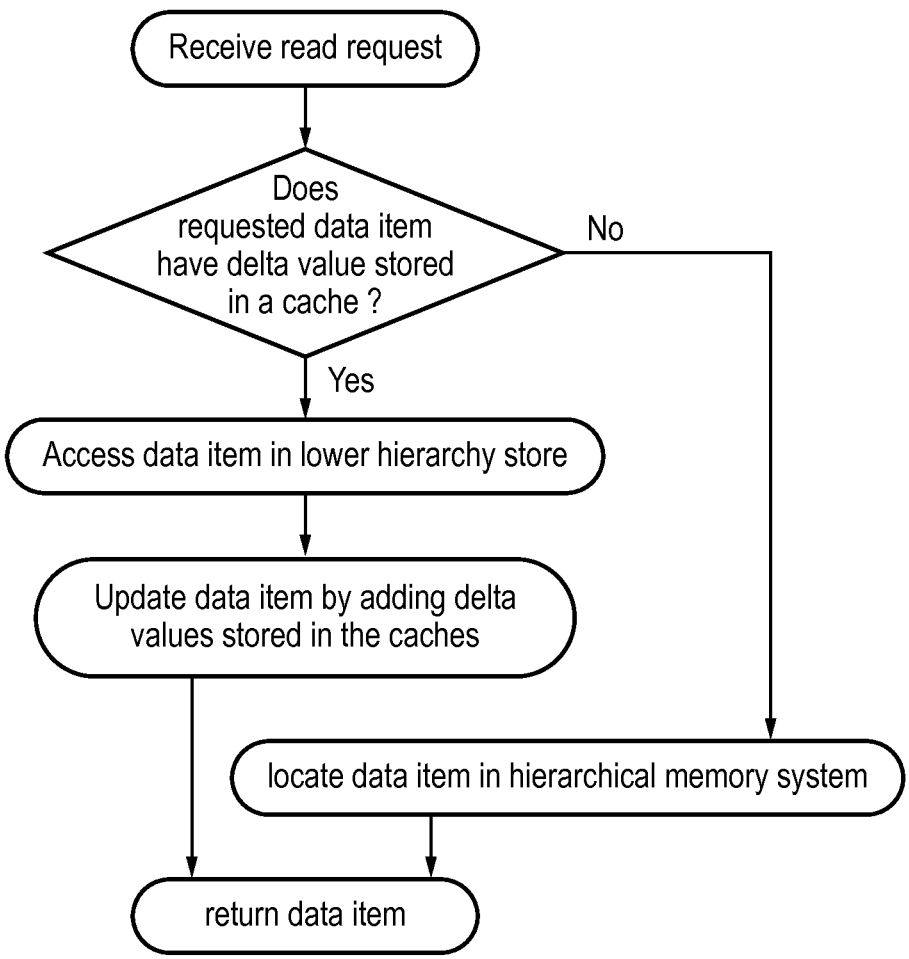
FIG. 7 shows a flow diagram illustrating steps in a method of returning a data item according to an embodiment of the present invention.

FIG. 7 shows steps in a method which occur when a read request is received for the apparatus of FIG. 1, where the only operations that use this technique are add, subtract, increment or decrement, the subtracts being performed by storing negative values and adding them. These are similar to the steps that are performed in response to other requests to return the data items which may be due to an eviction request or a clean cache request. A read request is received and it is determined if the requested data item has any related delta values stored in any caches. If it does then the data item itself is accessed in a lower hierarchy store and the data item is updated by adding the delta values stored in the caches to the data item. The updated data item can then be returned. If there are no delta values stored in any cache then the data item is located within the hierarchical memory system and is returned.

Figure 8:
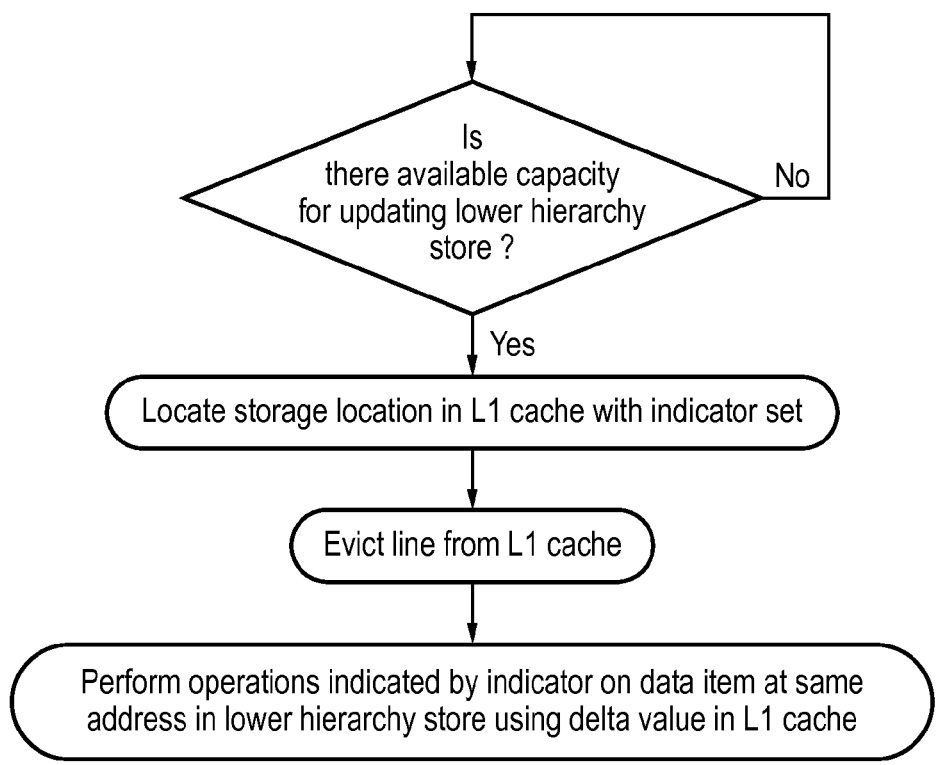
FIG. 8 shows a flow diagram illustrating steps in a method for improving performance according to an embodiment of the present invention.

FIG. 8 shows steps in a method where performance control circuitry is used to trigger cleaning of delta lines within caches where there is spare capacity in order to avoid the system having to stall for too long when cleaning caches that contain many delta lines. Initially it is determined whether there is available capacity for updating the lower hierarchy store. When there is capacity a storage location in the level one cache with an indicator set is located and this line is evicted from the level one cache and the operation indicated by the indicator associated with the delta value is performed on the data item which is located in the lower hierarchy store using the delta value from the level one cache. In this way delta values are cleaned from the level one cache and then when it later needs to be cleaned there are fewer operations that need to be performed.

It should be noted that although in this embodiment the line is simply evicted from the L1 cache, in other embodiments, the operation may be performed on the data item using the delta value stored, and the line may be updated with the initial value, such that it is still present if required for the at data item, but while it is still storing the initial value no updating of the data item with that value needs to be performed in response to a clean operation.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims. For example, various combinations of the features of the following dependent claims could be made with the features of the independent claims.

We claim:

1. A processing apparatus comprising:
a plurality of processors for processing data;
a hierarchical memory system comprising a plurality of data stores for storing said data, said hierarchical memory system comprising a memory accessible to all of said plurality of processors, and a plurality of caches corresponding to each of said plurality of processors, each of said caches being accessible to said corresponding processor and comprising a plurality of storage locations and a corresponding plurality of indicators, said memory having a lower hierarchy than said plurality of caches;
cache coherency control circuitry for maintaining coherency of data stored in said hierarchical memory system;
each of said plurality of processors being configured to respond to receipt of a predefined request to perform an operation on a data item, to determine if said cache corresponding to said processor receiving said request comprises a storage location allocated to said data item;
and if not, said processing apparatus is configured to:
allocate a storage location within said cache to said data item, set said indicator corresponding to said storage location to indicate that said storage location is storing a delta value, set data in said allocated storage location to an initial value, and said processor is configured in response to said predefined request to perform said operation on data within said storage location allocated to said data item.

2. A processing apparatus according to claim 1, wherein said predefined request comprises a request for a processor to perform an atomic operation that updates a data item and does not return a value to said processor executing said request.

3. A processing apparatus according to claim 1, wherein said predefined request comprises a marked request.

4. A processing apparatus according to claim 3, wherein said marked request is a request that has been identified and marked during compilation.

5. A processing apparatus according to claim 1, each of said plurality of processors being configured in response to determining that said cache corresponding to said processor receiving said predefined request comprises a storage location allocated to said data item and comprising said indicator indicating said storage location is storing said delta value to:

to update said delta value by performing said operation of said request on said delta value.

6. A processing apparatus according to claim 1, wherein said indicator comprises a plurality of bits and provides an indication of an operation corresponding to said delta value.

7. A processing apparatus according to claim 6, each of said plurality of processors being configured in response to determining that said cache corresponding to said processor receiving said request comprises a storage location allocated to said data item and comprising said indicator indicating said storage location is storing said delta value, to determine from said indicator if said operation corresponding to said delta value is compatible with said operation of said request:

and if so to update said delta value by performing said operation of said request on said delta value;

and if not to evict said storage location from said cache.

8. A processing apparatus according to claim 6, wherein said delta value comprises a value required for generating an updated data item from one or more combined operations, and said indicator indicates an operation to be performed on said data item using said delta value to generate said updated data item for those combined operations.

9. A processing apparatus according to claim 7, wherein operations that are compatible comprise a same operation or operations that form a group of operations that can be performed on a data item in any order and generate a same result.

10. A processing apparatus according to claim 1, wherein said operation comprises one of an add, subtract, increment or decrement, or a logical operation comprising an OR, AND or XOR or a comparative operation comprising a min or a max.

11. A processing apparatus according to claim 1, wherein said memory system comprises said plurality of caches with a high hierarchy, at least one lower hierarchy data store comprising at least one further cache, said at least one further cache being accessible to at least some of said plurality of processors, and said memory of a lowest hierarchy that is accessible to all of said plurality of processors.

12. A processing apparatus according to claim 1, wherein said cache coherency control circuitry is configured to respond to receipt of a request to return an updated data item, to determine if there is a storage location within any of said plurality of caches that is allocated to said requested data item and comprises said indicator indicating that said storage location stores said delta value, and if so to access said memory system to identify a data store currently storing said requested data item and to update said stored data item by performing an operation on said data item indicated by said indicator, using said delta values from each of said plurality of caches that comprise said storage location allocated to said data item and said indicator.

13. A processing apparatus according to claim 12, wherein said request to return said updated data item comprises one of an evict request to evict said data item from one of said plurality of caches and update said data item in a lower hierarchy data store or a read request to read said data item.

14. A processing apparatus according to claim 12, said processing apparatus further comprising operation circuitry associated with said lower hierarchy data store and configured to perform said operation on said data item indicated by said indicator using said delta values.

15. A processing apparatus according to claim 1, wherein said cache control circuitry is configured in response to determining said cache having a storage location allocated to said data item of said predefined request that does not have said indicator set to indicate storage of said delta value, to evict said data item to a lower hierarchy data store in said memory system.

16. A processing apparatus according to claim 10, said processing apparatus being configured to synchronise said memory system by generating a memory barrier request, said plurality of caches being configured in response to receipt of said memory barrier request to identify storage locations having said indicators and to evict said delta values from said storage locations and to update said corresponding data item in a lower hierarchy data store by performing operations indicated by said indicator on said data item using said delta value and to send a response to said memory barrier request when said updates are complete.

17. A processing apparatus according to claim 1, comprising performance control circuitry configured to identify storage locations within said plurality of caches with said delta value indicator set and to determine current available capacity for updating a lower hierarchy data store in said memory system, said performance control circuitry being configured to evict one of said identified storage locations and to update said corresponding data item in said lower hierarchy data store by performing an operation indicated by said indicator on said data item using said delta value in response to detecting available capacity.

18. A method of handling marked requests in a data processing apparatus comprising a plurality of processors for processing data, a hierarchical memory system comprising a plurality of data stores for storing said data, said hierarchical memory system comprising a memory accessible to all of said plurality of processors, and a plurality of caches corresponding to each of said plurality of processors, each of said caches being accessible to said corresponding processor and comprising a plurality of storage locations and a corresponding plurality of indicators, said memory having a lower hierarchy than said plurality of caches; and cache coherency control circuitry for maintaining coherency of data stored in said hierarchical memory system;

said method comprising the steps of:

in response to one of said plurality of processors receiving a predefined request to perform an operation on a data item;

determining if said cache corresponding to said processor receiving said request comprises a storage location allocated to said data item;

and if not: allocating a storage location within said cache to said data item,
   setting one of said indicators corresponding to said storage location to mark said storage location as storing a delta value,
   setting data in said allocated storage location to an initial value, and
updating data within said storage location allocated to said data item by performing said operation on said stored data.

19. A processing apparatus comprising:
a plurality of processing means for processing data;
a hierarchical memory system comprising a plurality of data storage means for storing said data, said hierarchical memory system comprising a memory accessible to all of said plurality of processing means, and a plurality of caching means corresponding to each of said plurality of processing means, each of said caching means being accessible to said corresponding processing means and comprising a plurality of storage locations and a corresponding plurality of indicators, said memory having a lower hierarchy than said plurality of caching means;
cache coherency control means for maintaining coherency of data stored in said hierarchical memory system;
each of said plurality of processing means being for responding to receipt of a predefined request to perform an operation on a data item to determine if said caching means corresponding to said processor receiving said request comprises a storage location allocated to said data item;
and if not, said cache coherency control means is for controlling storage of data in said hierarchical memory system by:
   allocating a storage location within said caching means to said data item,
   setting said indicator corresponding to said storage location to indicate that said storage location is storing a delta value,
   setting data in said allocated storage location to an initial value, and
said processing means is for responding to said predefined request to perform said operation on data within said storage location allocated to said data item.

* * * * *